(12) United States Patent
Duffy et al.

(10) Patent No.: US 8,491,689 B2
(45) Date of Patent: Jul. 23, 2013

(54) JOINED FILTER MEDIA PLEAT PACKS

(75) Inventors: Dean R. Duffy, Woodbury, MN (US);
Kenneth J. Snider, Woodbury, MN (US); Wenli Wang, Woodbury, MN (US); Ronald L. Wylie, Jr., St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 407 days.

(21) Appl. No.: 12/809,889

(22) PCT Filed: Dec. 12, 2008

(86) PCT No.: PCT/US2008/086518
§ 371 (c)(1),
(2), (4) Date: Jun. 21, 2010

(87) PCT Pub. No.: WO2009/085645
PCT Pub. Date: Jul. 9, 2009

(65) Prior Publication Data
US 2010/0269463 A1   Oct. 28, 2010

Related U.S. Application Data

(60) Provisional application No. 61/016,086, filed on Dec. 21, 2007.

(51) Int. Cl.
*B01D 46/00* (2006.01)
*B01D 46/52* (2006.01)

(52) U.S. Cl.
USPC .................... 55/484; 55/483; 55/497; 55/521

(58) Field of Classification Search
USPC ............................ 55/482, 483, 484, 521, 497
See application file for complete search history.

(56) References Cited

U.S. PATENT DOCUMENTS

| | | |
|---|---|---|
| 2,862,624 A | 12/1958 | Stokes |
| RE30,780 E | 10/1981 | Stenstrom |
| RE30,782 E | 10/1981 | Van Turnhout |
| 4,792,344 A | 12/1988 | Belcher |

(Continued)

FOREIGN PATENT DOCUMENTS

| | | |
|---|---|---|
| DE | 2730925 | 1/1979 |
| JP | 63-073128 U | 5/1988 |

(Continued)

OTHER PUBLICATIONS

ANSI/ASHRAE Standard 52.2-2007, "Method of Testing General Ventilation Air-Cleaning Devices for Removal Efficiency by Particle Size", (Supersedes ANSI/ASHRAE Standard 52.2-1999).

(Continued)

*Primary Examiner* — Robert Clemente
(74) *Attorney, Agent, or Firm* — Scott A. Baum (57) ABSTRACT

A joined filter media pleat pack assembly comprises at least two filter media pleat packs, wherein each pleat comprises a root and a crown, wherein a seam between each filter media pleat pack is at least one of: (a) structure wherein the pleats, crowns, and roots of one filter media pleat pack are interleaved or nested with the corresponding structure of an adjacent filter media pleat pack or (b) structure wherein at least a portion of the terminal edges of adjacent filter media pleat packs are mitered at complimentary angles and assembled in mating relation.

14 Claims, 6 Drawing Sheets

U.S. PATENT DOCUMENTS

| | | | |
|---|---|---|---|
| 5,158,635 A | 10/1992 | Schmierer | |
| 5,468,272 A | 11/1995 | Schmierer | |
| 5,472,460 A | 12/1995 | Schmierer | |
| 5,472,606 A | 12/1995 | Steere | |
| 5,496,507 A | 3/1996 | Angadjivand | |
| 5,792,228 A * | 8/1998 | Fath et al. | 55/497 |
| 6,059,851 A | 5/2000 | DePietro, III | |
| 6,406,509 B1 | 6/2002 | Duffy | |
| 7,125,490 B2 | 10/2006 | Clendenning | |
| 7,156,891 B2 | 1/2007 | Winters | |
| 2004/0011204 A1 | 1/2004 | Both | |

FOREIGN PATENT DOCUMENTS

| | | |
|---|---|---|
| JP | 63-098716 U | 6/1988 |
| JP | 63-221820 A | 9/1988 |
| JP | 64-025316 U | 2/1989 |
| JP | 05-070619 U | 9/1993 |
| JP | 3381006 | 5/1995 |
| JP | 7112108 | 5/1995 |
| WO | WO 2008/085689 | 7/2008 |

OTHER PUBLICATIONS

Wente, "Superfine Thermoplastic Fibers", Industrial and Engineering Chemistry, Aug. 1956, vol. 48, No. 8, pp. 1342-1346.
Extended European Search Report for EP Application No. 08866790.2, PCT/US2008/086518, 6 pgs., Apr. 1, 2011.
International Search Report for International Application No. PCT/US2008/086518, 3 pgs., Jul. 2, 2009.
Written Opinion of the ISA for International Application No. PCT/US2008/086518, 4 pgs., Jul. 2, 2009.

* cited by examiner

JOINED FILTER MEDIA PLEAT PACKS

CROSS REFERENCE TO RELATED APPLICATIONS

This application is a national stage filing under 35 U.S.C. 371 of PCT/US2008/086518, filed Dec. 12, 2008, which claims priority to Provisional Application No. 61/016,086, filed Dec. 21, 2007, the disclosure of which is incorporated by reference in its/their entirety herein.

BACKGROUND

Particulate matter in air is often undesirable (for example, irritating to breathe, or interferes with the performance of equipment). Therefore, there is a need to remove some or all of the particulate matter from air and gas streams over extended periods of time. For example, HVAC (heating, ventilation and air conditioning) air, aircraft cabin ventilation, clean room ventilation, air to engines for motorized vehicles, or to power generation equipment, gas streams directed to gas turbines, and air streams to various combustion furnaces often include particulate material that needs to be constantly filtered or otherwise removed.

Efficiency is the propensity of filter media to trap, rather than pass, particulates. Typically, larger particles are captured at a higher efficiency than smaller particles, and several particle sizes may be used in a test of efficiency. In some applications, it may be desirable to remove small particles at a high efficiency. Filter media are placed in an air or gas stream and restrict the flow of that stream to some extent. This is usually measured as a pressure drop across the filter (from the upstream to the downstream side). It may be desirable to have a low pressure drop across the filter media. For example, lower pressure drop may result in less energy usage to operate an HVAC system. Typically, initial pressure drop (that is, the pressure drop of clean filter media) is used to determine the pressure drop performance of a filter media. Generally speaking, as the filter media efficiency increases, the pressure drop increases. Filter media may be designed to optimize performance in view of the efficiency/pressure drop trade-off.

There is a continuing need for additional filter designs that provide desired or improved filtering efficiencies and initial pressure drop.

SUMMARY

In one aspect, the present disclosure provides a joined filter media pleat pack assembly comprising at least two (for example, in some embodiments at least three, four, five, six, seven, or even at least eight) filter media pleat packs. Each filter media pleat pack has a longitudinal axis, and comprises a plurality of longitudinal pleats having folds. Each pleat comprises a root and a crown. Each filter media pleat pack has a thickness and two terminal edges oriented perpendicular to the folds of the pleats. The longitudinal axis of each filter media pleat pack is positioned in a substantially non-parallel orientation with respect to the longitudinal axis of each adjacent filter media pleat pack. At least one terminal edge of each filter media pleat pack is assembled in a seam with the terminal edge of an adjacent filter media pleat pack, wherein at least one of:

(a) the seam comprises structure wherein the pleats of one filter media pleat pack are interleaved with the pleats of an adjacent filter media pleat pack, wherein the crown of each pleat in one filter media pleat pack is nested with a corresponding crown of an adjacent filter media pleat pack, and wherein the root of each pleat in one filter media pleat pack is nested with a corresponding root of an adjacent filter media pleat pack, and wherein the crowns of each pleat in one pleat pack overlaps the crowns of each pleat in an adjacent filter media pleat pack, or (b) the seam comprises structure wherein at least a portion of the terminal edges of adjacent filter media pleat packs are mitered at complimentary angles and assembled in mating relation.

In some embodiments, the seam further comprises at least one side band member. In some embodiments, the seam further comprises adhesive disposed between adjacent mitered filter media pleat packs.

In some embodiments, the joined filter media pleat pack assembly comprises at least two seams, wherein at least one seam comprises structure wherein the pleats of one filter media pleat pack are interleaved with the pleats of an adjacent filter media pleat pack, wherein the crown of each pleat in one filter media pleat pack is nested with a corresponding crown of an adjacent filter media pleat pack, and wherein the root of each pleat in one filter media pleat pack is nested with a corresponding root of an adjacent filter media pleat pack, and wherein the crowns of each pleat in one filter media pleat pack overlaps the crowns of each pleat in an adjacent filter media pleat pack, and wherein at least one seam comprises structure, wherein terminal edges of adjacent filter media pleat packs are mitered at complimentary angles and assembled in mating relation.

In some embodiments, the joined filter media pleat pack assembly further comprises a frame member positioned over the seam of each filter media pleat pack. In some embodiments, each seam is potted in an adhesive material (for example, a hot melt adhesive).

A pair of nested or mitered pleat packs provides a seam that has a dimension perpendicular to the seam length that is less than the corresponding dimension from a seam that is formed with conventional seams. As a consequence, it is possible to seal nested or mitered pleat packs into a filter frame with frame openings that are larger, and this filter (frame plus filter media) may have improved pressure drop performance.

DETAILED DESCRIPTION

Referring to FIGS. 1-4, exemplary joined filter media pleat pack assembly 10 is shown. Joined filter media pleat pack assembly 10 comprises filter media pleat packs 20a, 20b, each filter media pleat pack 20a, 20b having a longitudinal axis 30a, 30b and comprising a plurality of longitudinal pleats 40a, 40b having folds 42a, 42b. Each pleat comprises a root (as shown for pleat pack 20a, root 44a, and, for pleat pack 20b, root 44b) and a crown (as shown for pleat pack 20a, crown 46a, and for pleat pack 20b, crown 46b). Each filter media pleat pack has a thickness 22a, 22b and terminal edges 24a, 25a, 24b, 25b oriented perpendicular to folds 42a. The longitudinal axis of each filter media pleat pack is positioned in a substantially non-parallel orientation with respect to the longitudinal axis of each adjacent filter media pleat pack, wherein at least one terminal edge of each filter media pleat pack is assembled in a seam 50 with terminal edge of an adjacent filter media pleat pack. Seam 50 comprises structure wherein the pleats of one filter media pleat pack are interleaved with the pleats of an adjacent filter media pleat pack, wherein a crown (for example, 46a) of each pleat in one pleat pack (for example, 20a) is nested with a corresponding crown (for example, 46b) of an adjacent filter media pleat pack (for example, 20b), and wherein the root (for example, 44a) of each pleat in one filter media pleat pack (for example, 20a) is nested with a corresponding root (for 15 example, 44b) of an adjacent filter media pleat pack (for example, 20b), and wherein the crowns (for example, 44a) of each pleat in one filter media pleat pack overlaps the crowns (for example, 44b) of each pleat in an adjacent filter media pleat pack along the length of seam 50. Each seam 50 is optionally potted in adhesive material 60 (for example, a hot melt adhesive) to filter frame 58. It is generally desirable to have sufficient adhesive 20 material 60 to substantially seal the filter frame 58 to the pleat packs 20a, 20b, so that when in use for example, in an air duct, air cannot leak around the pleat packs and particulates are removed by the filter media.

Figure 5:
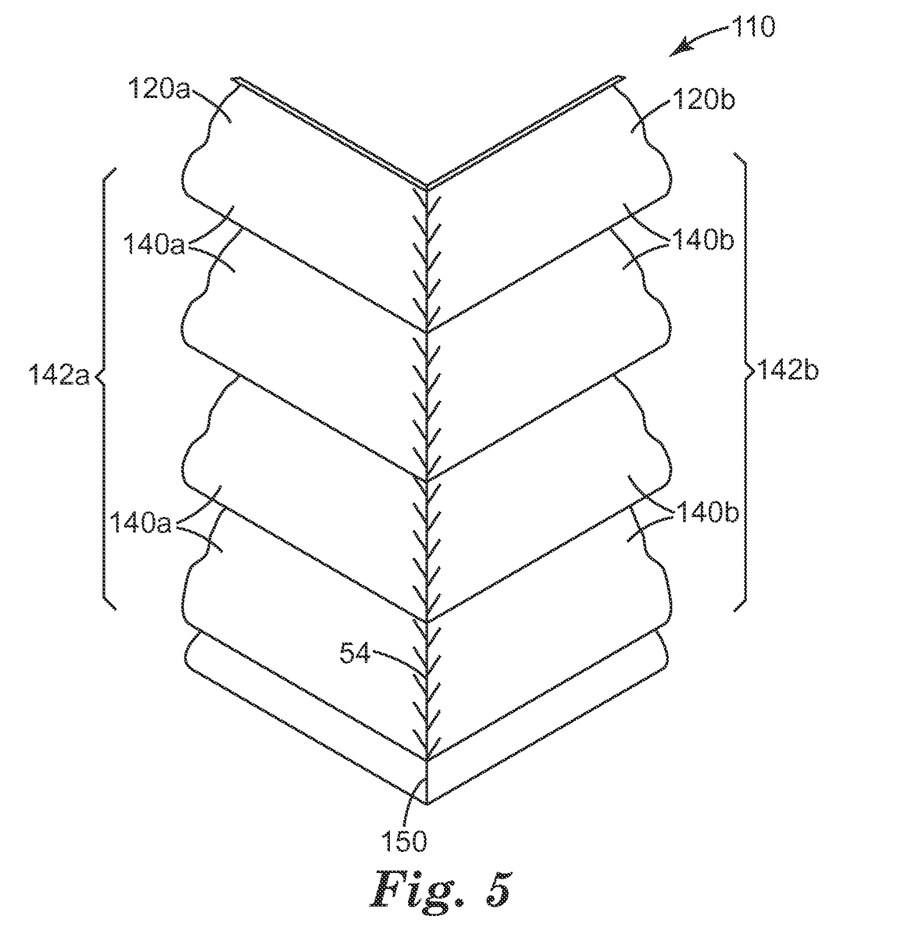
FIG. 5 is a partial perspective view of a terminal end of another joined filter media pleat pack described herein.

Referring to FIGS. 5-8, exemplary joined filter media pleat pack assembly 110 is shown. Joined filter media pleat pack assembly 110 comprises filter media pleat packs 120a, 120b. Each filter media pleat pack 120a, 120b having a longitudinal axis 130a, 130b and comprises a plurality of longitudinal pleats 140a, 140b having folds 142a, 142b. A terminal edge 54 is shown in FIG. 5. Each pleat comprises a root 144a and a crown 146a. Each pleat optional comprises side band 222 (for example, a hot melt adhesive) of the pleat pack to provide additional stability to the pleat pack during pleating and subsequent manufacturing step. Although not shown, in some embodiments, it may be desirable to have the side band extend to cover the root(s) to ease nesting of the pleat packs to provide improved sealing between pleat packs. Each filter media pleat pack has a thickness 122a, 122b and terminal edges 124a, 125a, 124b, 125b oriented perpendicular to folds 142a, 142b. The longitudinal axis of each filter media pleat pack is positioned in a substantially non-parallel orientation with respect to the longitudinal axis of each adjacent filter media pleat pack, wherein at least one terminal edge of each filter media pleat pack is assembled in a seam 150 with terminal edge of an adjacent filter media pleat pack. Seam 150 comprises structure wherein at least a portion of the terminal edges of adjacent filter media pleat packs are mitered 125a, 125b at complimentary angles 8a, 8b and assembled in mating relation. Optionally each seam 150 is potted in adhesive material 160 (for example, a hot melt adhesive) to filter frame 158. It is generally desirable to have sufficient adhesive material 160 to substantially seal the filter frame 158 to the pleat packs 120a, 120b, so that when in use, for example, in an air duct air cannot leak around the pleat packs and particulates are removed by the filter media.

Figure 1:
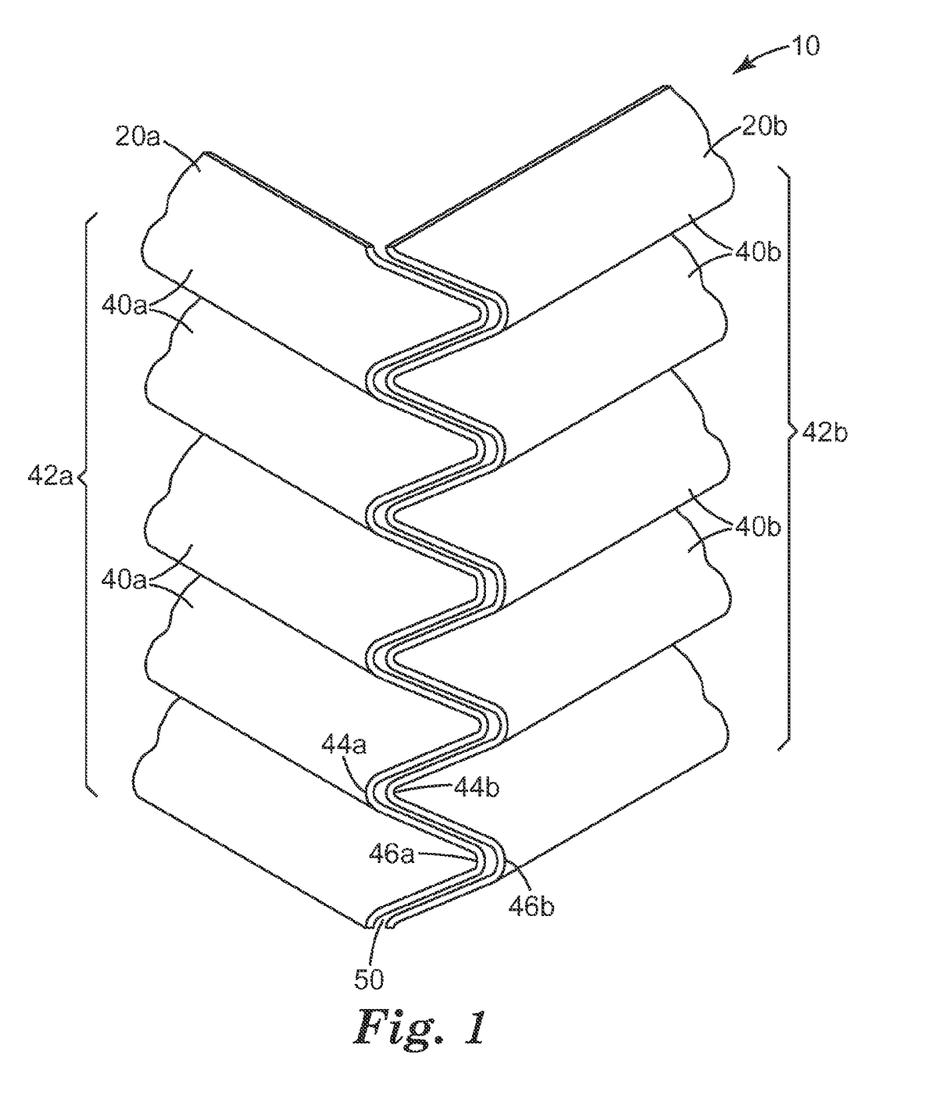
FIG. 1 is a partial perspective view of a terminal end of joined filter media pleat pack described herein.
Figures 2, 3:
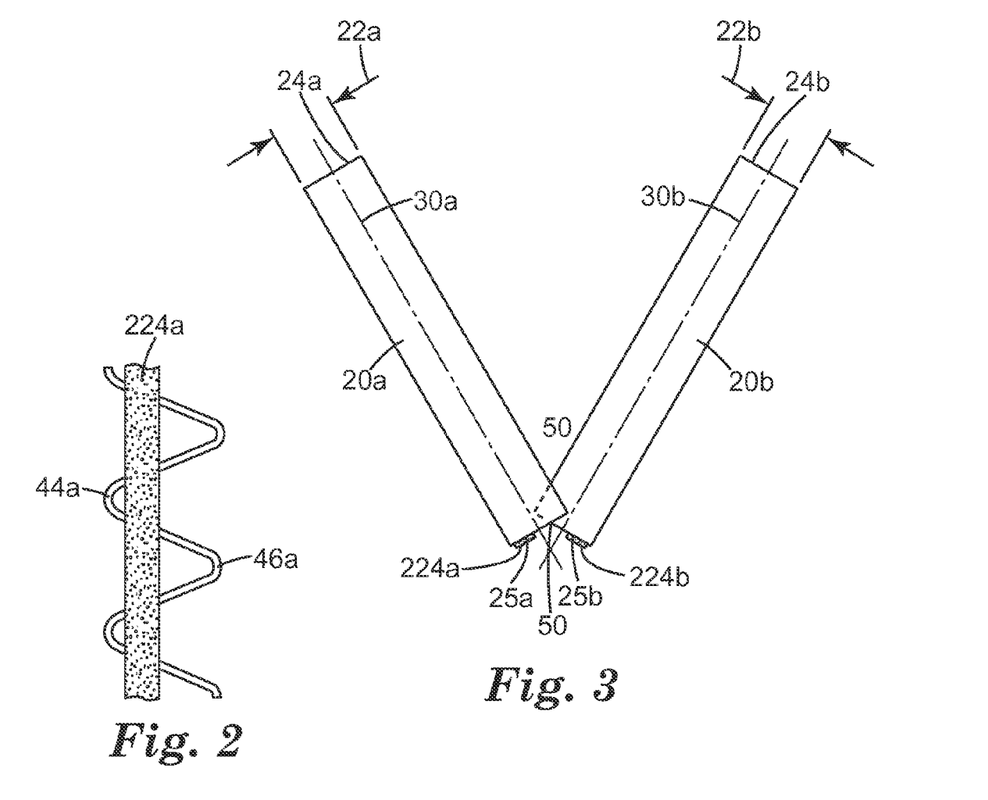
FIG. 2 is a partial end view of a pleat from FIG. 1.
FIG. 3 is a partial top view of two joined filter media pleat packs from FIG. 1.

Referring to FIGS. 2 and 3, optionally, a pleat pack may comprise side band of material 224a, 224b (for example, a hot melt adhesive) along terminal edges 25a, 25b (although optionally or alternatively could be present on 24a, 24b) of the pleat pack to provide additional stability to the pleat pack during pleating and subsequent manufacturing steps. Side bands 224a, 224b (which are not depicted in FIG. 1 because they would obscure the view of the rest of the structure) may provide part or all of the sealing of pleat pack seam 50. Alternatively, for example, side band 224a, 224b may provide all or part or all of a location for the placement of additional materials, including adhesives and other flexible, formed materials (for example, non-woven materials) to seal seam 50.

Figure 6:
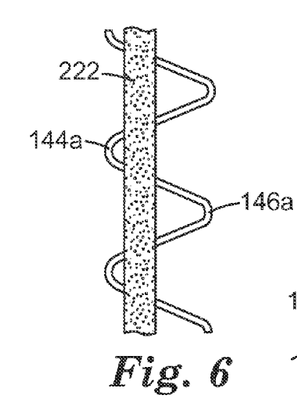
FIG. 6 is a partial end view of a pleat from FIG. 5.
Figure 7:
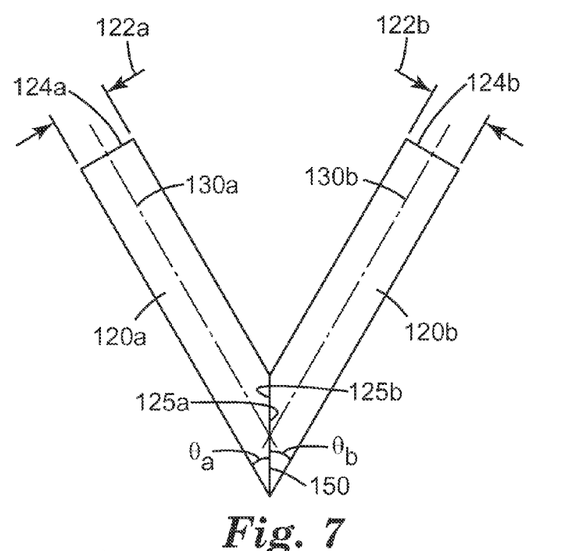
FIG. 7 is a partial top view of a two joined filter media pleat packs from FIG. 5.
Figure 9:
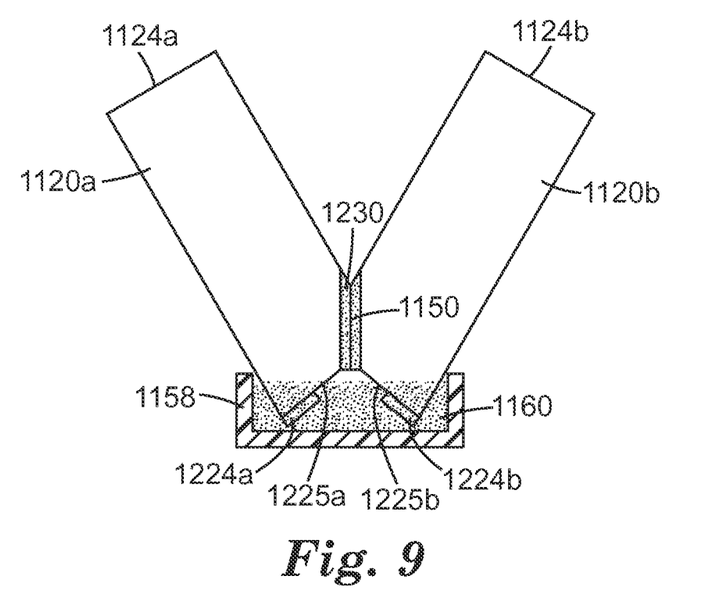
FIG. 9 is a partial top view of another embodiment of two joined filter media pleat packs described herein.

Optionally, portion of filters 1120a, 1120b may be mitered to form a seam 1150 as shown in FIG. 9, which also shows optional side bands 1224a, 1224b along terminal ends 1125a, 1125b (although optionally or alternatively could be present on 1124a, 1124b), optional adhesive material 1230, optional potting adhesive 1160 and optional filter frame 1158. Side band 222a is also depicted in FIG. 6.

Figure 10:
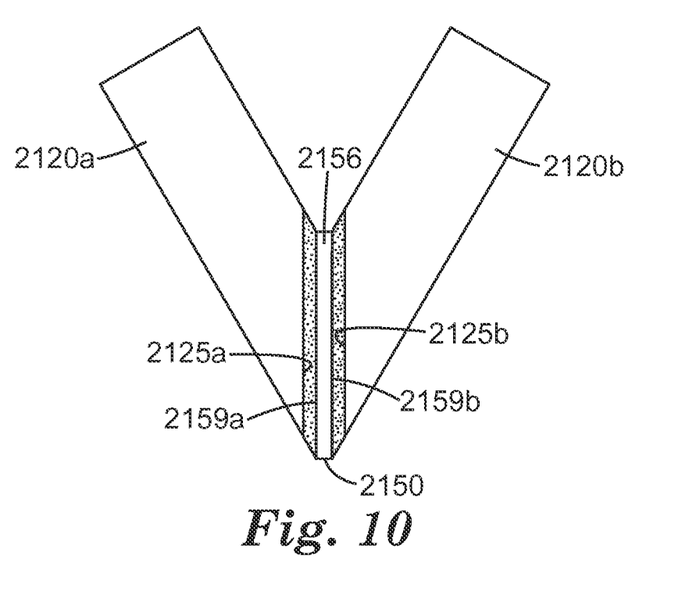
FIG. 10 is a partial top view of yet another embodiment of two joined filter media pleat packs described herein.

Alternatively, for example, optional material 2156 may be positioned between mitered terminal edges 2125a, 2125b of adjacent filter media pleat packs 2120a, 2120b, and optionally adhesive material 2159a, 2159b may be used in combination with material 2156 or without material 2156 to form a seal at seam 2150. Material 2156 may be, for example, porous or non-porous plastic, metal, non-woven materials, films, and scrims.

In some embodiments, the joined filter media pleat pack assembly comprises at least two (in some embodiments, at least three, four, five, six, or even at least seven) seams, wherein at least one (in some embodiments, at least three, four, five, six, or even at least seven) seam comprises structure wherein the pleats of one (in some embodiments, at least two, three, four, five, six, seven, or even at least eight) filter media pleat pack are interleaved with the pleats of an adjacent filter media pleat pack, wherein the crown of each pleat in one filter media pleat pack is nested with a corresponding crown of an adjacent filter media pleat pack, and wherein the root of each pleat in one filter media pleat pack is nested with a corresponding root of an adjacent filter media pleat pack, and wherein the crowns of each pleat in one filter media pleat pack overlaps the crowns of each pleat in an adjacent filter media pleat pack; and wherein at least one (in some embodiments, two, three, four, five, six, or even at least seven) seam comprises structure, wherein terminal edges of adjacent filter media pleat packs are mitered at complimentary angles and assembled in mating relation.

In some embodiments, the pleats of one filter media pleat pack overlap the pleats of an adjacent filter media pleat pack in a range from 10% to 99% (in some embodiments, 20% to 99%, 30% to 99%, 40% to 99%, or even from 50% to 99%) of the thickness of each filter media pleat pack, although overlaps outside of these range may also be useful.

In some embodiments, the seam comprises structure wherein at least a portion of the terminal edges of adjacent filter media pleat packs are mitered at complimentary angles and assembled in mating relation. In some embodiments, the seam further comprises at least one side band member positioned between the mitered terminal edges of adjacent filter media pleat packs. Typically, the complimentary angles are in a range from 15° to 45° (in some embodiments, in a range from 15° to 60°, or even, 10° to 75°), although angles outside of these range may also be useful. In some embodiments, portions of the terminal edges of adjacent filter media pleat packs are mitered at complimentary angles and assembled in mating relation (see, for example, FIG. 9).

Filter frames may be constructed, for example, of polymer resins, metals, or combinations thereof, and may include injection-molded, extruded or converted parts or any combination thereof. Other materials, such as non-woven materials, spunbonded materials and scrims, may also useful, for example, for portions of the frame. Techniques for forming of filter media into suitable configurations, such as pleats of various pleat depths and pleat spacings, are known in the art. Methods of making filter assemblies by assembling filter frame components and filter media in various configurations are also known to those skilled in the art. Further, in some embodiments, a desirable filter frame may be as described in U.S. application having Ser. No. 61/016,096, filed the same date as the instant application.

It may be desirable to seal or pot filter media to filter frame members to reduce or prevent the flow of gas (for example, air) around the filter media. In some embodiments, adhesives (for example, hot melt adhesives, curable adhesives (for example, two-part urethanes)) may be used for this purpose.

Typically, an even number of filter media pleat packs is used (for example, two, four, six, or eight, etc.). Typically, a filter media pleat pack has a thickness in a range from 1 cm to 10 cm (in some embodiments, in a range from 2 cm to 6 cm), although thicknesses outside of these range may also be useful.

Filter media may be made of materials known in the art for such purpose, including fiberglass, synthetics (polymers), natural fibers, and combinations thereof. Filter media of various efficiencies, including composite filter media comprising two materials of two efficiencies (for example, a fine fiber and a coarse fiber), are known in the art. Filter media efficiencies may be measured, for example, by standard methods (for example, American Society of Heating, Refrigerating and Air Conditioning Engineers (ASHRAE) 52.2-1999 test standard "Method of Testing General Ventilation Air-Cleaning Devices for Removal Efficiency by Particle Size").

In some embodiments, it may be desirable to optimize filter performance, particularly pressure drop, by selection of nesting parameters (for example, the amount of overlap) or by selection of mitering parameters (for example, the amount of pleat pack removed by mitering or the miter angle). It may be desirable to adjust the overlap in the nested filters taking into account the thickness of the filter media. It also may be desirable to adjust frame dimensions, for example, by mitering or nesting overlap.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Filter Media Webs

Web 1

Web 1 was prepared as follows. A polypropylene based melt blown microfiber (BMF) web was prepared using a melt blowing process generally as described in Wente, "Superfine Thermoplastic Fibers," in *Industrial Engineering Chemistry*, Vol. 48, pages 1342 et seq (1956). The extruder had ten temperature control zones that were maintained at 400° F. (204° C.), 455° F. (235° C.), 495° F. (257° C.), 535° F. (279° C.), 550° F. (288° C.), 565° F. (296° C.), 590° F. (310° C.), 605° F. (318° C.), 610° F. (321° C.) and 620° F. (327° C.), respectively. The flow tube connecting the extruder to the die was maintained at 575° F. (302° C.). The BMF die was maintained at 600° F. (316° C.). The primary air was maintained at 610° F. (321° C.), and 3.6 psi (24.8 kilopascals (kPa)) with a 0.076 cm gap width. Polypropylene resin was delivered from the BMF die. The resulting web was collected on a perforated rotating drum collector positioned 13.0 inches (33 cm) from the collector. The collector drum was connected to a vacuum system which could be optionally turned on or off while collecting the BMF web, thereby allowing a higher solidity web to be prepared when a vacuum was applied to the collector drum.

The BMF web was charged using a hydroocharging process substantially as described in U.S. Pat. No. 5,496,507 (Angadjivand et al.), using a water pressure of about 690 kPa.

The resulting web (that is, Web 1) was 0.58 mm thick, and had a basis weight of 29 g/m$^2$ with fibers having an effective diameter of 9.5 micrometers. Web efficiency was 70% and pressure drop was 1.6 mm H$_2$O when a circular web sample of 100 cm$^2$ test area was tested using an automatic filter testing machine (Type 8130; obtained from TSI, Incorporated, Minneapolis, Minn.) with a dioctylphthalate (DOP) aerosol at 85 liter/min.

Web 2

Electrostatically charged, fibrillated, coarse polypropylene fibers having a basis weight of 40 g/m$^2$ ultrasonically bonded to a polypropylene scrim having a basis weight 10 g/m$^2$ were prepared as follows.

Electrostatically charged fibrillated, coarse polypropylene fibers were prepared as described in Example 1 of U.S. Pat. No. Re. 30782 (van Turnhout). A 45 micrometer thick, 5 cm wide isotactic polypropylene film was stretched to a ratio of 1:6 over a block (see Example 1 of Re. 30780 (van Turnhout)) heated to 110° C., followed by a second stretching over a plate (again see Example 1 of Re. 30780 (van Turnhout)) heater to 130° C. at a stretching ratio of 1:1.5. The transport velocity of film during stretching was 12.2 m/min. During the second stretching, the film was charged by passing it between corona wires connected to −3.2 KV and a top plate at +3 KV. The distance from the corona wires to the plate was 5 mm.

The resulting film was fibrillated with a 60 row needle roller having needles 500 micrometer apart. The charged fibrillate was spread to about 45 cm and wound up on a roller into a mass with a thickness of 3 mm. The fibrillated fibers had typical average dimensions of 10 by 40 micrometers in a cross-sectional view. The basis weight of the fibrillated fibers was about 40 g/m$^2$. The thickness of Web 2 was about 1.1 mm. Next, the fibrillated fibers and a scrim layer with a basis weight of 10 g/m$^2$ were ultrasonically joined as described in Example 2 of U.S. Pat. Publication No. 2004/0011204 (Both), utilizing equipment as described therein with a rotating drum with protrusions. About 2% of the area of the resulting web had ultrasonically bonded spots generally dispersed across the major surfaces of the web of size 0.81 mm×0.81 mm. The number of spots per cm$^2$ was about 2.3. The electrostatic charge on the resulting ultrasonically joined web was about 50 nC/cm$^2$.

Pleated Filter Media

Pleated filter media were prepared from Web 1 and Web 2 as follows: The web (Web 1 or Web 2) was laminated onto a spunbonded polyester scrim having a basis weight 90 g/m$^2$ (obtained under the trade designation "568/90" (also referred to as J-90) from Johns-Manville, Denver, Colo.), using laminating adhesive (available under the trade designation "3M SUPER 77 MULTIPURPOSE ADHESIVE" from 3M Company, St. Paul Minn.).

The laminated filter media were pleated using conventional pleating techniques to a pleat depth (see 22a, 22b, 122a, 122b in FIGS. 3 and 7) of 2.54 cm, a pleat spacing of 5 mm. The pleated media was then cut into pleat packs of about 28 cm×55 cm, with pleat packs roots and crowns running parallel to longitudinal axis 30a, 30b, 130a, 130b in FIGS. 3 and 7.

Prototype Filters

Figure 4:
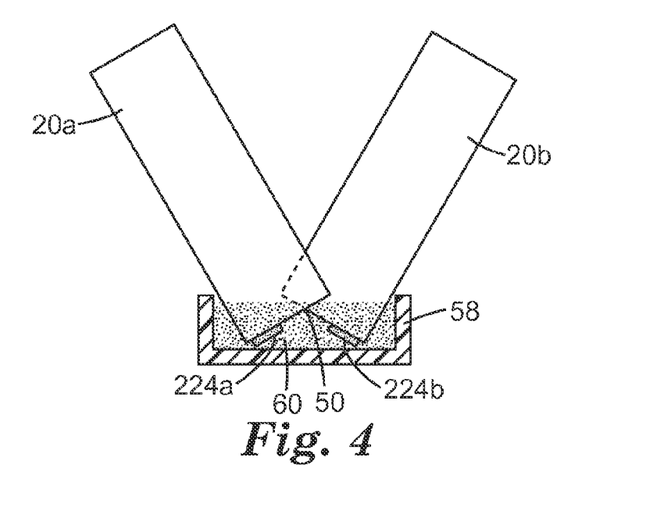
FIG. 4 is a partial top view of a seam of a pleat from FIG. 1 potted in an adhesive material.
Figure 8:
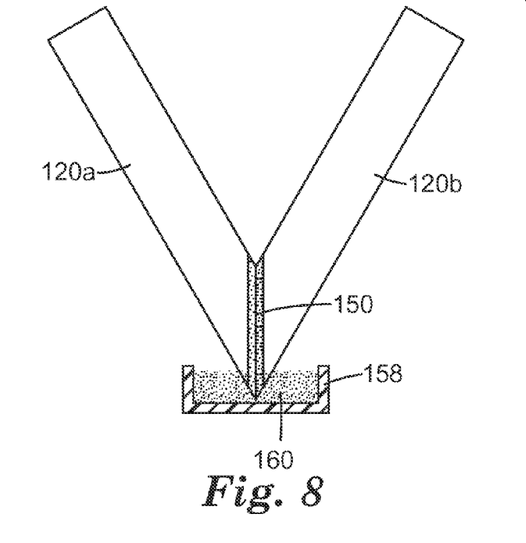
FIG. 8 is a partial top view of a seam of a pleat from FIG. 5 potted in an adhesive material.
Figure 11:
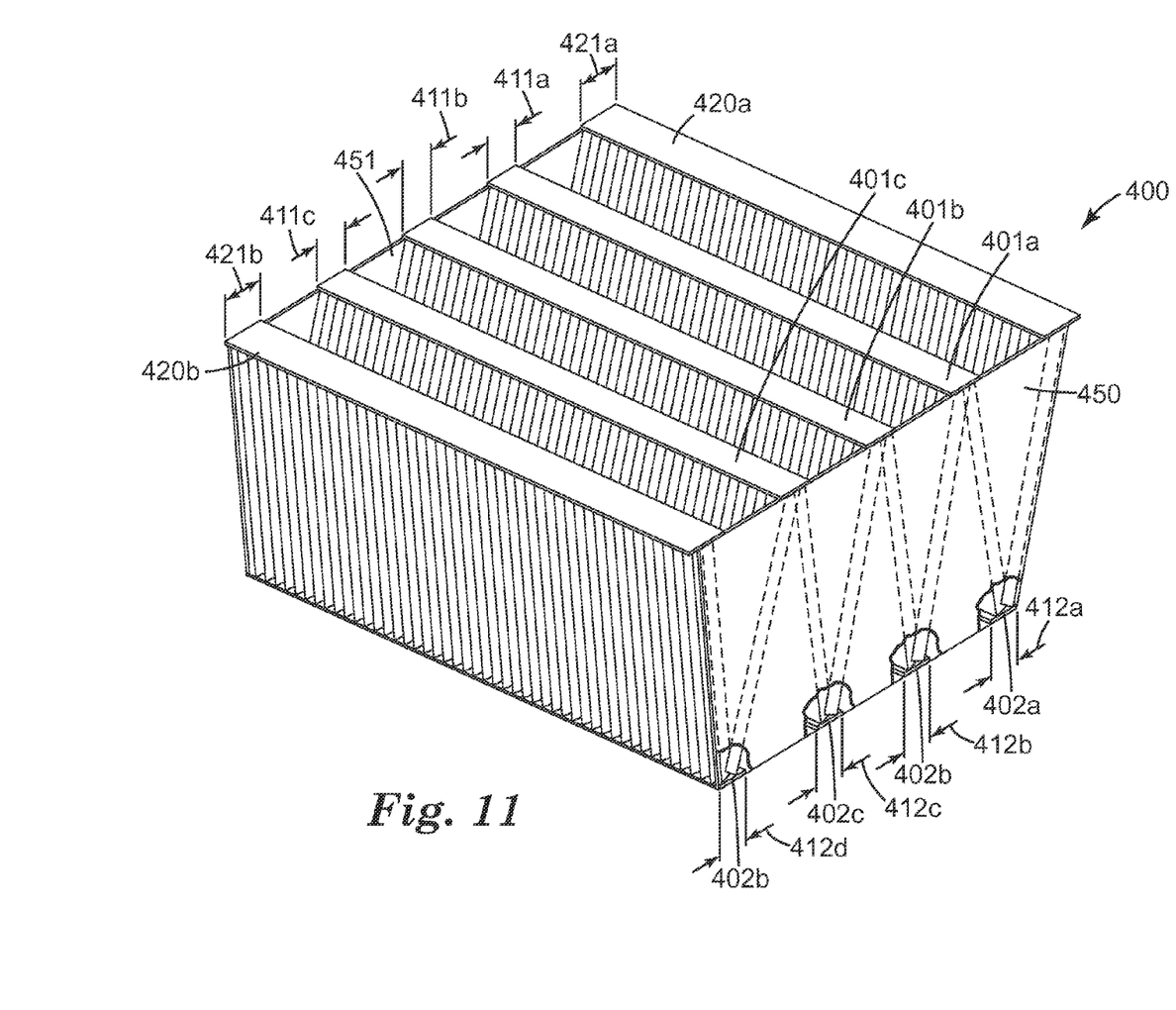
FIG. 11 is a perspective view of a filter comprising a filter frame and joined filter media pleat packs described herein.

Prototype frames (400 in FIG. 11) were assembled from parts as follows. Posterboard (heavy cardboard) was cut into trapezoids of having lengths of about length 50 cm and about 57 cm, and a depth about 28 cm (the shape and the dimensions of the ends 450, 451 of a nominal 61 cm×61 cm×30 cm 4-V V-bank filter assembly were as shown in FIG. 11). Extruded polypropylene frame members 58, 158 in FIGS. 4 and 8, shown in greater detail as frame members 401a, 401b, 401c in FIG. 11 and also frame members labeled 402a, 402b, 402c, 402d in FIG. 11 were constructed in widths of 5.72 cm, 4.13 cm, and 3.18 cm. Eight filter media pleat packs were used in assembling each prototype, with each set of adjacent pleat packs nested to the extent necessary so as to fit within the front frame dimensions 411a, 411b, 411c, and back frame dimensions 412a, 412b, 412c, 412d. Front frame outer edges 420a, 420b were formed of extruded polypropylene, and were of width 421a, 421b of 4.13 mm (1.625 inch). Frame members were assembled and pleat packs sealed to the frame members using a hot melt adhesive (obtained under the trade designation "BOSTIK HM 9041" from Bostik Adhesives, Wauwatosa, Wis.).

Test for Initial Pressure Drop of Nominal 61 cm×61 cm×30 cm (24 inch×24 inch×12 inch) 4-V V-Bank Filter.

The filter prototypes were tested per American Society of Heating, Refrigerating and Air-Conditioning Engineers (ASHRAE) 52.2-1999 test standard "Method of Testing General Ventilation Air-Cleaning Devices for Removal Efficiency by Particle Size".

A clean nominal 61 cm×61 cm×30 cm 4-V V-bank pleated filter was sealed to a template and installed in a nominal 61 cm×61 cm test duct. One pressure sensor (obtained from MKS Instruments Inc., Andover, Mass.) was positioned with two taps located in the test duct, one at the upstream side of the filter and one at the downstream side to measure the initial pressure drop of the clean filter. Air flow supply from the blower was set to 55.8 m³/minute (1970 ft.³/minute, CFM) with a laminar flow element (obtained from Merriam Instruments, Cleveland, Ohio; Model 50MC2-6).

The results of pleated filter media with Web 1 laminated to J-90 tested in the prototype filter are shown in Table 1, below. The amount of nesting was adjusted to achieve front frame width 411a, 411b, 411c and back frame width 412a, 412b, 412c, 412d as shown in FIG. 11, and is listed in Table 1, below.

TABLE 1

| | Filter media | Pleat spacing, mm | Front frame width 411a, b, c, cm | Back frame width 412a, b, c, d, cm | dP (cm WC*) |
|---|---|---|---|---|---|
| Comp. A | Web 1 + J90 | 5 | 5.72 | 5.72 | 0.53 |
| 1 | Web 1 + J90 | 5 | 3.18 | 4.13 | 0.38 |

*WC = water column

Comparative Filter A was constructed in the same manner with non-nested, pleated filter media with Web 1 laminated to J-90. The test results for this construction are shown in Table 1, above.

The results of pleated filter media with Web 2 laminated to J-90 tested in the prototype filter are shown in Table 2, below. The amount of nesting was adjusted to achieve front frame width 411a, 411b, 411c and back frame width 412a, 412b, 412c, 412d as shown in FIG. 11 and listed in Table 2, below.

TABLE 2

| | Filter media | Pleat spacing, mm | Front frame width 411a, b, c, cm | Back frame width 412a, b, c, d, cm | dP (cm WC) |
|---|---|---|---|---|---|
| Comp. B | Web 2 + J90 | 5 | 5.72 | 5.72 | 0.58 |
| 2 | Web 2 + J90 | 5 | 3.18 | 4.13 | 0.56 |

Comparative Filter B was constructed in the same manner with non-nested, pleated filter media with Web 2 laminated to J-90. The results are shown in Table 2, above.

Prototype frames were assembled containing no filter media, with frame dimension as shown in FIG. 11, where front frame dimensions 411a, 411b, 411c and back frame dimensions 412a, 412b, 412c, 412d were as shown in Table 3, below.

TABLE 3

| | Front frame width 411a, b, c, cm | Back frame width 412a, b, c, d, cm | dP (cm WC) |
|---|---|---|---|
| Comp. C | 5.72 | 5.72 | 0.30 |
| 3 | 4.13 | 4.13 | 0.18 |
| 4 | 3.18 | 4.13 | 0.15 |
| 5 | 3.18 | 3.18 | 0.11 |

Comparative Prototype Frame C dimensions are those that would be used in a conventional filter construction without nesting or mitering of the pleat packs, for pleat packs of pleat depth 2.54 cm, allowing for the thickness of the frame, a small manufacturing tolerance and two 2.54 cm pleat packs attached to the frame. Prototype Frames 3, 4, and 5 had dimensions that would be used with varying degrees of nesting or mitering, with 3.18 cm being about the smallest dimension that could be practically used with fully nested pleat packs of pleat depth 2.54 cm, allowing for the thickness of the frame and a small manufacturing tolerance.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A joined filter media pleat pack assembly comprising at least four filter media pleat packs, each filter media pleat pack having a longitudinal axis and comprising a plurality of longitudinal pleats having folds, wherein each pleat comprises a root and a crown, wherein each filter media pleat pack has a thickness and two terminal edges oriented perpendicular to the folds of the pleats, wherein the longitudinal axis of each filter media pleat pack is positioned in a substantially non-parallel orientation with respect to the longitudinal axis of each adjacent filter media pleat pack, and wherein at least one terminal edge of each filter media pleat pack is assembled in a seam with the terminal edge of an adjacent filter media pleat pack, wherein:

the seam comprises structure wherein only a portion of the terminal edges of adjacent filter media pleat packs are mitered at complimentary angles and assembled in mating relation.

2. The joined filter media pleat pack assembly of claim 1, wherein the seam further comprises at least one side band member.

3. The joined filter media pleat pack assembly of claim 1, wherein the seam further comprises adhesive disposed between adjacent mitered filter media pleat packs.

4. The joined filter media pleat pack assembly of claim 1 further comprising;
a seam that comprises structure wherein the pleats of one filter media pleat pack are interleaved with the pleats of an adjacent filter media pleat pack, wherein the crown of each pleat in one filter media pleat pack is nested with a corresponding crown of an adjacent filter media pleat pack, and wherein the root of each pleat in one filter media pleat pack is nested with a corresponding root of an adjacent filter media pleat pack, and wherein the crowns of each pleat in one filter media pleat pack overlap the crowns of each pleat in an adjacent filter media pleat pack.

5. The joined filter media pleat pack assembly of claim 1, wherein the complimentary angles are in a range from 10° to 75°.

6. The joined filter media pleat pack assembly of claim 4, wherein the pleats of one filter media pleat pack overlap the pleats of an adjacent filter media pleat pack in a range from 10% to 99% of the thickness of each filter media pleat pack.

7. The joined filter media pleat pack assembly of claim 1, further comprising a frame member, wherein a frame member is positioned over the seam of each filter media pleat pack.

8. The joined filter media pleat pack assembly of claim 2, further comprising a frame member, wherein a frame member is positioned over the seam of each filter media pleat pack.

9. The joined filter media pleat pack assembly of claim 6, further comprising a frame member, wherein a frame member is positioned over the seam of each filter media pleat pack.

10. The joined filter media pleat pack assembly of claim 1, wherein each seam is potted in an adhesive material.

11. The joined filter media pleat pack assembly of claim 2, wherein each seam is potted in an adhesive material.

12. The joined filter media pleat pack assembly of claim 10, wherein the adhesive material is a hot melt adhesive.

13. The joined filter media pleat pack assembly of claim 11, wherein the adhesive material is a hot melt adhesive.

14. A filter comprising a frame member and at least one joined filter media pleat pack according to claim 1.

\* \* \* \* \*

UNITED STATES PATENT AND TRADEMARK OFFICE
CERTIFICATE OF CORRECTION

PATENT NO. : 8,491,689 B2  
APPLICATION NO. : 12/809889  
DATED : July 23, 2013  
INVENTOR(S) : Dean Roy Duffy et al.

Page 1 of 1

It is certified that error appears in the above-identified patent and that said Letters Patent is hereby corrected as shown below:

In the Specification:

Column 3
Line 24, after "for" delete "15".
Line 32, after "adhesive" delete "20".

Column 6
Line 14, delete "hydroocharging" and insert -- hydrocharging --, therefor.

In the Claims:

Column 9
Line 8, in Claim 4, delete "comprising;" and insert -- comprising --, therefor.

Signed and Sealed this
Third Day of December, 2013

Margaret A. Focarino
*Commissioner for Patents of the United States Patent and Trademark Office*